United States Patent
Noomen

[11] Patent Number: 6,066,045
[45] Date of Patent: May 23, 2000

[54] COMBINE TRAY LIFT

[76] Inventor: Wayne Noomen, 2756 181st St., Currie, Minn. 56123-1049

[21] Appl. No.: 09/130,682

[22] Filed: Aug. 6, 1998

[51] Int. Cl.[7] .............................. A01F 12/32; B07B 1/00
[52] U.S. Cl. .............................................. 460/101; 460/94
[58] Field of Search .................................. 460/101, 102, 460/85, 86, 901, 94

[56] References Cited

U.S. PATENT DOCUMENTS

| | | | |
|---|---|---|---|
| 25,677 | 10/1859 | Seebold | 460/94 |
| 1,243,284 | 10/1917 | Goodman | 460/94 |
| 1,257,802 | 2/1918 | Butterworth | 460/101 |
| 1,383,916 | 7/1921 | Fadness | 460/94 |
| 1,402,984 | 1/1922 | White | 460/94 |
| 1,682,207 | 8/1928 | Wood | 460/94 |
| 2,212,092 | 8/1940 | Wood | 460/94 |
| 2,500,803 | 3/1950 | Cockrell | 460/94 |
| 2,712,385 | 7/1955 | Dion | 460/94 |
| 4,325,465 | 4/1982 | Lemon | 188/4 R |
| 4,723,558 | 2/1988 | Usick | 460/101 |
| 4,863,415 | 9/1989 | Carnewal et al. | 460/101 |
| 5,795,223 | 8/1998 | Spiesberger et al. | 460/102 |

FOREIGN PATENT DOCUMENTS

| | | | |
|---|---|---|---|
| 004036931A | 5/1992 | Germany | 460/102 |

Primary Examiner—Robert E. Pezzuto
Assistant Examiner—Meredith C. Petravick
Attorney, Agent, or Firm—Kaardal & Associates, PC

[57] ABSTRACT

A combine tray lift system for selectively positioning a combine tray includes a pair of tray lift assemblies attachable to combine tray securing nuts on opposite sides of a combine. Each tray lift assembly includes a rotatable sleeve having a handle, a protrusion, and locking members disposed therefrom. A bar member is coupled between the protrusion and the tray securing nut such that rotating the sleeve adjusts the position of the combine tray. A locking bar is provided for engaging a selected one of the locking members to hold the tray in a selected position. In a preferred embodiment, a lock disengaging member is coupled to the handle such that the locking bar can be disengaged while gripping the handle.

12 Claims, 3 Drawing Sheets

COMBINE TRAY LIFT

BACKGROUND OF THE INVENTION

1. Field of the Invention

The present invention relates to selectively positionable combine trays and more particularly pertains to a new combine tray lift system for selectively positioning a combine tray.

2. Description of the Prior Art

The use of selectively positionable combine trays is known in the prior art. More specifically, selectively positionable combine trays heretofore devised and utilized are known to consist basically of familiar, expected and obvious structural configurations, notwithstanding the myriad of designs encompassed by the crowded prior art which have been developed for the fulfillment of countless objectives and requirements.

Known prior art selectively positionable combine implements and the like include U.S. Pat. Nos. 4,180,966; 3,137,984; 3,400,525; 4,175,366; 4,996,831; 5,628,610; 5,490,757; 5,157,905; and PCT Patent No. WO 84/04652.

While these devices fulfill their respective, particular objectives and requirements, the aforementioned patents do not disclose a new combine tray lift. The inventive device includes handles attachable to combine tray securing nuts on opposite sides of a combine.

In these respects, the combine tray lift according to the present invention substantially departs from the conventional concepts and designs of the prior art, and in so doing provides an apparatus primarily developed for the purpose of selectively positioning a combine tray.

SUMMARY OF THE INVENTION

In view of the foregoing disadvantages inherent in the known types of selectively positionable combine trays now present in the prior art, the present invention provides a new combine tray lift construction wherein the same can be utilized for selectively positioning a combine tray.

The general purpose of the present invention, which will be described subsequently in greater detail, is to provide a new combine tray lift apparatus and method which has many of the advantages of the selectively positionable combine trays mentioned heretofore and many novel features that result in a new combine tray lift which is not anticipated, rendered obvious, suggested, or even implied by any of the prior art selectively positionable combine trays, either alone or in any combination thereof.

To attain this, the present invention generally comprises handles attachable to combine tray securing nuts on opposite sides of a combine.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new combine tray lift apparatus and method which has many of the advantages of the selectively positionable combine trays mentioned heretofore and many novel features that result in a new combine tray lift which is not anticipated, rendered obvious, suggested, or even implied by any of the prior art selectively positionable combine trays, either alone or in any combination thereof.

It is another object of the present invention to provide a new combine tray lift which may be easily and efficiently manufactured and marketed.

It is a further object of the present invention to provide a new combine tray lift which is of a durable and reliable construction.

An even further object of the present invention is to provide a new combine tray lift which is susceptible of a low cost of manufacture with regard to both materials and labor, and which accordingly is then susceptible of low prices of sale to the consuming public, thereby making such combine tray lift economically available to the buying public.

Still yet another object of the present invention is to provide a new combine tray lift which provides in the apparatuses and methods of the prior art some of the advantages thereof, while simultaneously overcoming some of the disadvantages normally associated therewith.

Still another object of the present invention is to provide a new combine tray lift for selectively positioning a combine tray.

Yet another object of the present invention is to provide a new combine tray lift system which includes handles attachable to combine tray securing nuts on opposite sides of a combine.

Still yet another object of the present invention is to provide a new combine tray lift system that permits one person to raise a combine tray.

Even still another object of the present invention is to provide a new combine tray lift that does not require a person to lift a combine tray from the inside of the combine and hold the tray while the securing bolts are tightened outside the combine.

Still another object of the invention is to provide a safe combine tray lift system that allows safe positioning of the combine tray by allowing a person to adjust the combine tray while standing clear from moving parts of the combine.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
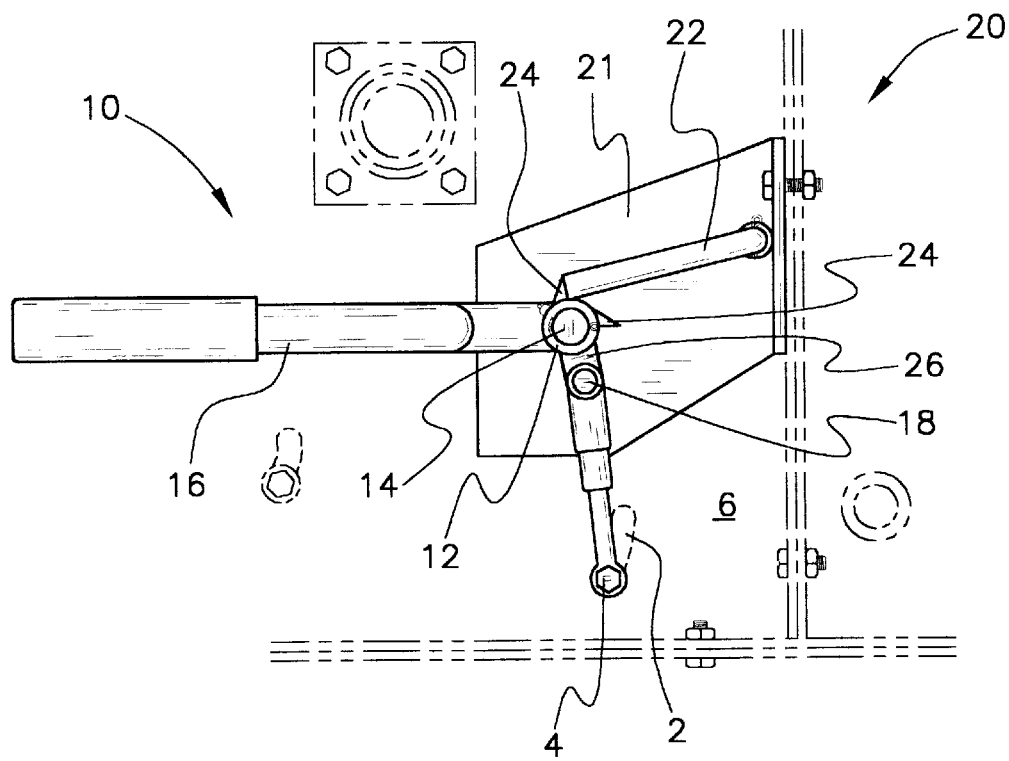
FIG. 1 is a front view of a new combine tray lift system according to the present invention.
Figure 2:
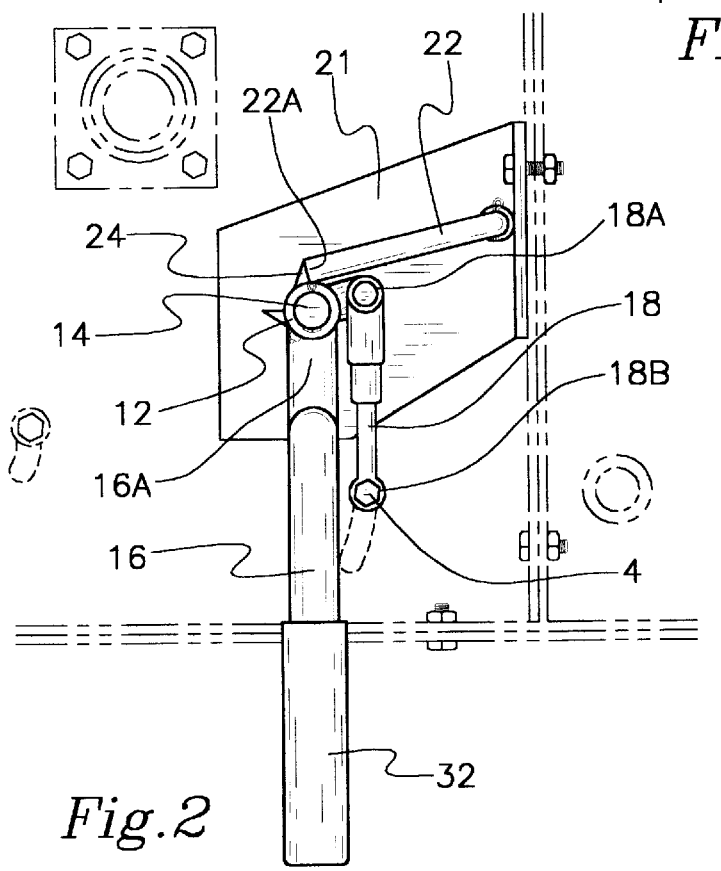
FIG. 2 is a front view of the present invention when the combine tray is in the lifted position.
Figure 3:
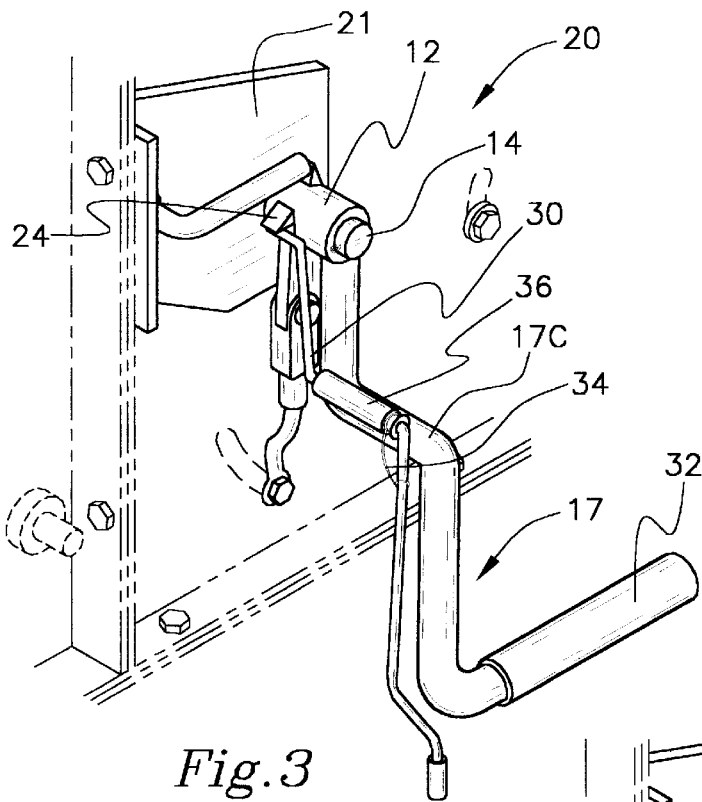
FIG. 3 is a perspective view of a second lift assembly of the present invention when the combine tray is in FIG. 4 is a perspective view of the second lift assembly when the combine tray is in the lifted position.
Figure 4:
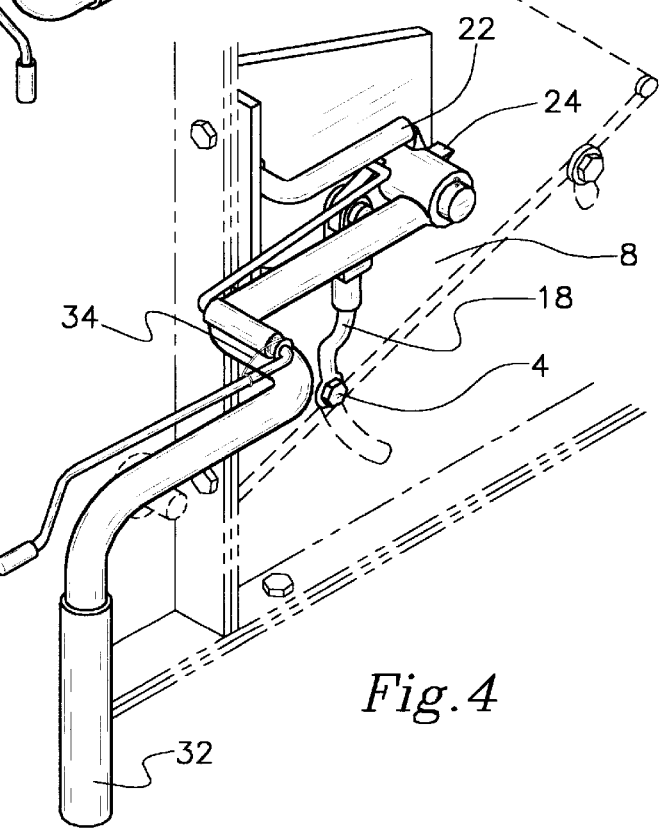
Figure 5:
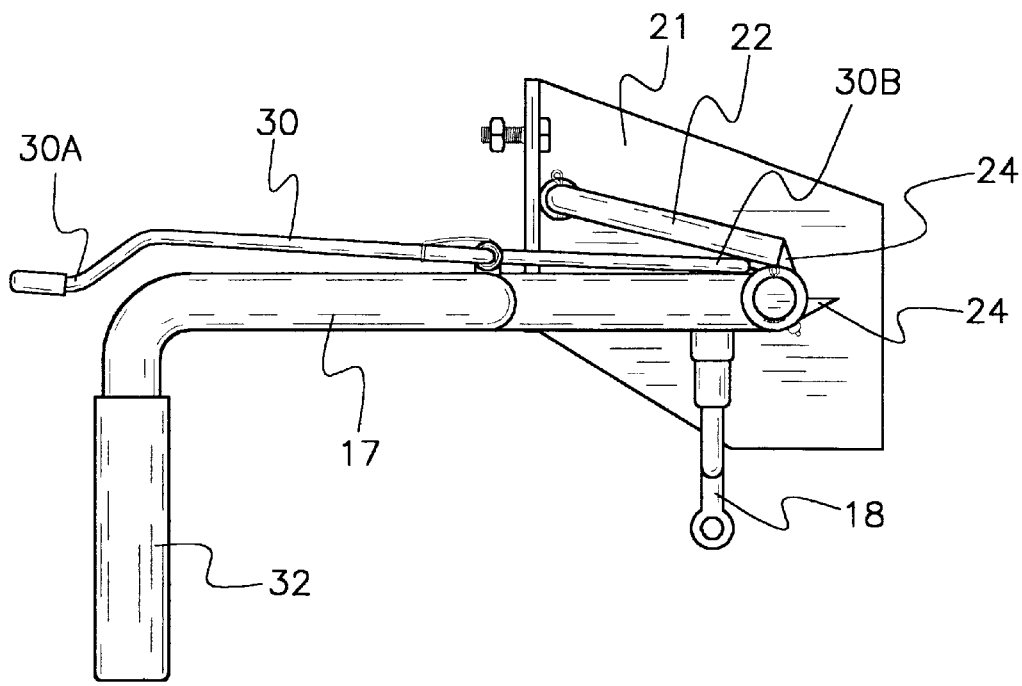
FIG. 5 is a front view of the second lift assembly.
Figure 6:
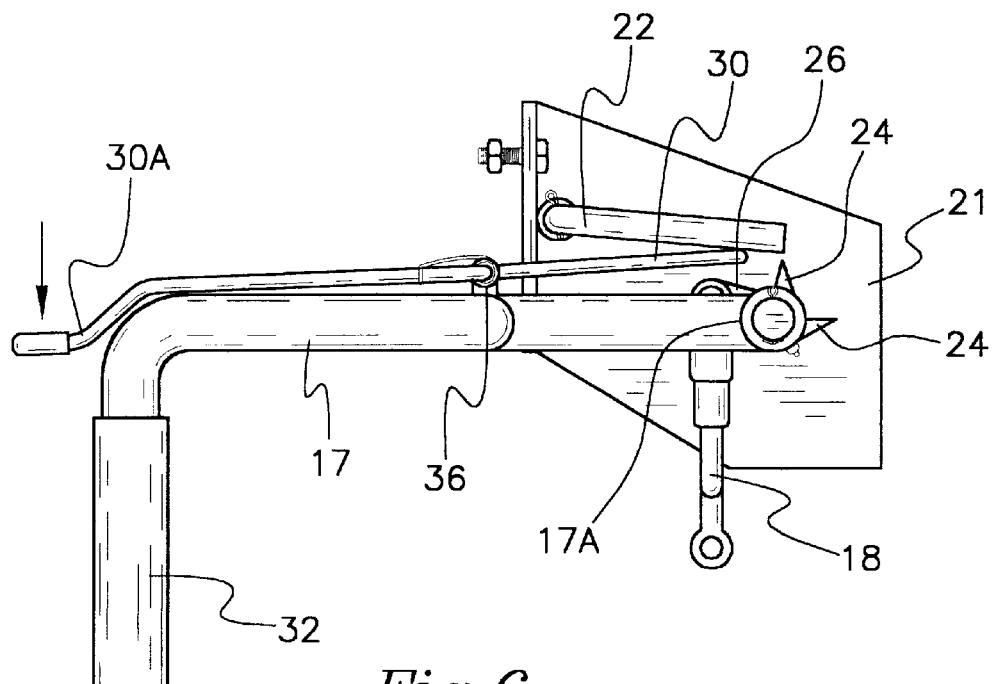
FIG. 6 is a front view of the second lift assembly with the lock disengaging bar disengaging the locking bar from the locking mechanism.

With reference now to the drawings, and in particular to FIGS. 1 through 6 thereof, a new combine tray lift embodying the principles and concepts of the present invention and generally designated by the reference numeral 10 will be described.

As best illustrated in FIGS. 1 through 6, the combine tray lift system 10 comprises a combine 6 having an interior tray 8. The interior tray 8 has an upper position and a lower position and a pair of tray bolts 4 extending outwardly from opposite ends of the tray 8. The tray bolts 4 extend through respective slots 2 in the combine 6 such that the tray 8 is adjustable between the upper position and the lower position by adjusting the tray bolts 4.

A pair of tray lift assemblies 20 are designed for positioning on opposite sides of the combine 6 near a respective one of the slots 2 in the combine 6. Each one of the tray lift assemblies 20 includes a base member 21 designed for coupling to an outer surface of the combine 6 near one of the pair of tray bolts 4 extending outwardly through one of the slots 2 in the combine 6. A pin 14 is disposed from the base member 21. A substantially annular sleeve 12 is positioned around the pin 14 such that the sleeve 12 can rotate about the pin 14. A first end 16A of a handle 16 is coupled to the sleeve 12 such that the handle 16 is pivotally coupled to the pin 14. A protrusion 26 extends radially outward from the sleeve 12. A first end 18A of a bar member 18 is pivotally coupled to the protrusion 26. A second end 18B of the bar member 18 designed for pivotally coupling to the tray bolt 4 such that the tray is engaged to the bar member 18 whereby the weight of the tray 8 urges the sleeve 12 to rotate in a first direction.

A plurality of locking members 24 extend outwardly from the sleeve 12. A locking bar 22 is pivotally coupled to the base member 21. The locking bar 22 has a distal end 22A for selectively engaging each of the locking members 24 such that the sleeve 12 is prevented from rotating in the first direction.

In a most preferred embodiment, at least one of the pair of tray lift assemblies 20, shown particularly in FIGS. 3 through 6, includes a medial portion of a lock disengaging member 30 pivotally coupled to the handle 17 by a connector 36 disposed from a medial portion of the handle 17.

The lock disengaging member 30 has a first end 30A proximate a gripping portion 32 of the handle 17 and a second end 30B positioned near the sleeve 12 adjacent one of the locking members 24.

A spring member 34 is provided for biasing the second end 30B of the lock disengaging member 30 against the sleeve. The first end 30A is then positioned in spaced relationship to the gripping portion 32 of the handle 17.

The first end 30A of the lock disengaging member 30 is positioned such that the first end 30A can be moved by a digit of a hand of a user when the user grips the gripping portion 32 of the handle 17. By moving the first end 30A, the second end 30B is moved outwardly from the sleeve 12 to disengage the locking bar 22 from the locking member 24 adjacent the second end 30B of the lock disengaging member 30, thereby permitting rotation of the sleeve 12 to adjust the position of the tray 8.

Also in the most preferred embodiment, the handle 17 includes an offset portion 17C for positioning the gripping portion 32 away from the exterior of the combine 6. The handle 16, shown in FIGS. 1 and 2 includes an offset portion similar in shape to the offset portion 17C. The offset portion 17C may also be adjusted to position the gripping portion 32 away from moving parts of the combine 6 or other hazards such that the gripping portion can safely be grasped.

In use, the handle of each tray lift assembly is preferably adapted using offsets or curvatures to position the gripping portion of the handle away from moving parts or other potentially dangerous portions of the combine. For those combines on which the tray bolts are positioned near dangerous moving parts, the lock disengaging member is preferred so that the sleeve can be rotated without having to manually move the locking bar. For those combines where no dangers are positioned close to the tray bolt, the tray lift assembly need not include the lock disengaging member because the locking bar may be safely moved manually. The lock disengaging member may be included or excluded as appropriate for the particular combine.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A combine tray lift system comprising:

a combine having an interior tray with tray bolts extending from opposite ends thereof, said tray bolts extending outwardly through respective arcuate slots in the combine such that a distal end of each tray bolt is positioned outside the combine, the interior tray being adjustable by sliding said tray bolts in said slots;

a pair of tray lift assemblies, each tray lift assembly coupled to opposing exterior sides of said combine proximate a respective one of said tray bolts;

each said tray lift assembly engaging a respective one of said tray bolts;

each said tray lift assembly being adjustable to slide the tray bolt in the slot whereby the tray position is adjusted;

a locking means for holding the tray lift assembly in position whereby the tray is held in a selected position.

2. The combine tray lift system of claim 1, wherein the locking means comprises:

a locking bar coupled to a base member of the tray lift assembly such that the locking bar is free to rotate;

said tray lift assembly having a sleeve for rotating about a pin extending from said base member;

said sleeve being coupled to said tray bolt such that rotation of said sleeve slides said tray bolt in said slot;

a plurality of locking members extending from said sleeve of the tray lift assembly;

said locking bar being positioned to abut a selected one of said locking members such that said sleeve is prevented from rotating whereby said tray is held in position.

3. The combine tray lift system of claim 2, wherein said locking means further comprises:

a lock disengaging member coupled to said tray lift assembly;

a biasing means for urging said lock disengaging member into a first position such that said locking bar is engageable to one of said locking members;

said lock disengaging member being manipulatable into a second position such that said lock disengaging member rotates said locking bar away from an engaged one of said locking members such that said sleeve is rotatable whereby said tray is adjustable.

4. The combine tray lift system of claim 1 wherein each said tray lift assembly comprises:

a base member adapted for coupling to an outer surface of the combine;

a pin disposed from said base member;

a substantially annular sleeve positioned around said pin such that said sleeve can rotate about said pin;

a first end of a handle coupled to said sleeve such that said handle is pivotally coupled to said pin;

a protrusion extending radially outward from said sleeve;

a first end of a bar member pivotally coupled to said protrusion; and a second end of the bar member adapted for pivotally coupling to the tray bolt such that the weight of the tray urges the sleeve to rotate in a first direction.

5. The combine tray lift system of claim 4 wherein each of said handles includes an offset portion and a gripping portion.

6. The combine tray lift system of claim 5 wherein the gripping portion of a second one of said handles is disposed from said offset portion at substantially a right angle.

7. The combine tray lift system of claim 6 wherein said locking means comprises:

a locking bar coupled to the base member of each of the tray lift assemblies such that the locking bar is free to rotate;

a plurality of locking members extending from said sleeve of the tray lift assembly;

said locking bar being positioned to abut a selected one of said locking members such that said sleeve is prevented from rotating whereby said tray is held in position.

8. The combine tray lift system of claim 7 wherein said locking means further comprises:

a lock disengaging member coupled to said second handle;

a biasing means for urging said lock disengaging member into a first position such that said locking bar is engageable to one of said locking members;

said lock disengaging member being manipulatable into a second position such that said lock disengaging member rotates said locking bar away from an engaged one of said locking members such that said sleeve is rotatable whereby said tray is adjustable.

9. A combine tray lift system for attachment to a combine having an interior tray, the interior tray having an upper position and a lower position, the tray further having a pair of tray bolts, the tray bolts extending outwardly from opposite ends of the tray and through respective arcuate slots in the combine such that the tray is adjustable between the upper position and the lower position by adjusting the tray bolts, said combine tray lift system comprising:

a pair of tray lift assemblies adapted for positioning on opposite exterior sides of the combine proximate a respective one of the slots in the combine, each one of said tray lift assemblies including a base member adapted for coupling to an outer surface of the combine proximate one of the pair of tray bolts extending outwardly through one of the slots in the combine;

a pin disposed from said base member;

a substantially annular sleeve positioned around said pin such that said sleeve can rotate about said pin;

a first end of a handle coupled to said sleeve such that said handle is pivotally coupled to said pin;

a protrusion extending radially outward from said sleeve;

a first end of a bar member pivotally coupled to said protrusion;

a second end of the bar member adapted for pivotally coupling to the tray bolt such that the weight of the tray urges the sleeve to rotate in a first direction;

a plurality of locking members extending outwardly from said sleeve; and a locking bar pivotally coupled to said base member, said locking bar having a distal end for selectively engaging each of said locking members such that said sleeve is prevented from rotating in said first direction.

10. The combine tray lift system of claim 9 wherein one of said pair of tray lift assemblies further comprises:

a medial portion of a lock disengaging member pivotally coupled to said handle by a connector disposed from a medial portion of said handle;

said lock disengaging member having a first end proximate a gripping portion of said handle, said lock disengaging member further having a second end positioned proximate said sleeve adjacent one of said locking members;

a spring member for biasing said lock disengaging member such that said second end abuts said sleeve and said first end is positioned in spaced relationship to said gripping portion of said handle;

said first end of said lock disengaging member being positioned such that said first end is manipulatable by a digit of a hand of a user when said user grips said gripping portion of said handle such that said second end of said handle is movable outwardly from said sleeve to disengage said locking bar from said locking member adjacent said second end of said lock disengaging member.

11. A combine tray lift system comprising, in combination:

a combine having an interior tray, the interior tray having an upper position and a lower position, the tray further having a pair of tray bolts, the tray bolts extending outwardly from opposite ends of the tray and through respective slots in the combine such that the tray is adjustable between the upper position and the lower position by manipulating the tray bolts;

a pair of tray lift assemblies for positioning on opposite exterior sides of the combine proximate a respective one of the slots in the combine, each one of said tray lift assemblies including a base member adapted for coupling to an outer surface of the combine proximate one of the pair of tray bolts extending outwardly through one of the slots in the combine;

a pin disposed from said base member;

a substantially annular sleeve positioned around said pin such that said sleeve can rotate about said pin;

a first end of a handle coupled to said sleeve such that said handle is pivotally coupled to said pin;

a protrusion extending radially outward from said sleeve;

a first end of a bar member pivotally coupled to said protrusion;

a second end of the bar member adapted for pivotally coupling to the tray bolt such that the weight of the tray urges the sleeve to rotate in a first direction;

a plurality of locking members extending outwardly from said sleeve; and a locking bar pivotally coupled to said base member, said locking bar having a distal end for selectively engaging each of said locking members such that said sleeve is prevented from rotating in said first direction.

12. The combine tray lift system of claim 11 wherein one of said pair of tray lift assemblies further comprises:

a medial portion of a lock disengaging member pivotally coupled to said handle by a connector disposed from a medial portion of said handle;

said lock disengaging member having a first end proximate a gripping portion of said handle, said lock disengaging member further having a second end positioned proximate said sleeve adjacent one of said locking members;

a spring member for biasing said lock disengaging member such that said second end abuts said sleeve and said first end is positioned in spaced relationship to said gripping portion of said handle;

said first end of said lock disengaging member being positioned such that said first end is manipulatable by a digit of a hand of a user when said user grips said gripping portion of said handle such that said second end of said handle is movable outwardly from said sleeve to disengage said locking bar from said locking member adjacent said second end of said lock disengaging member.

* * * * *